(No Model.)
M. W. ILES.
APPARATUS FOR SEPARATING MATTE FROM SLAG.
No. 558,648. Patented Apr. 21, 1896.
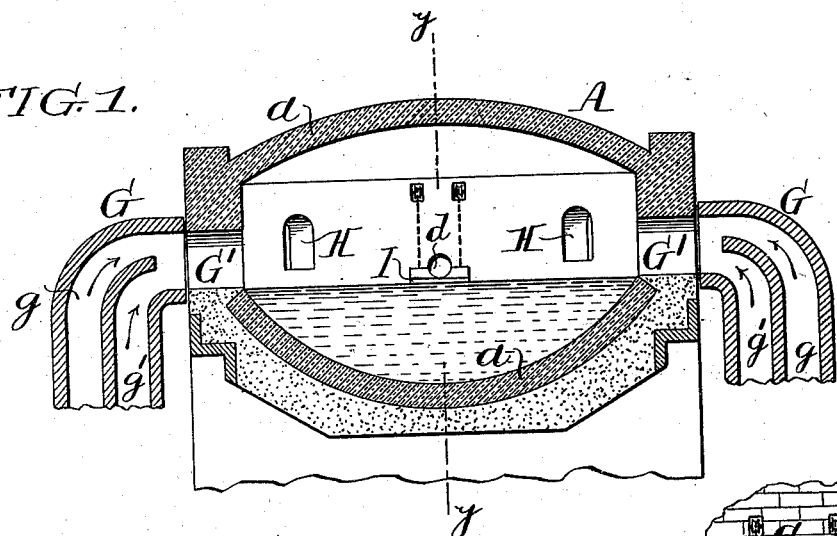
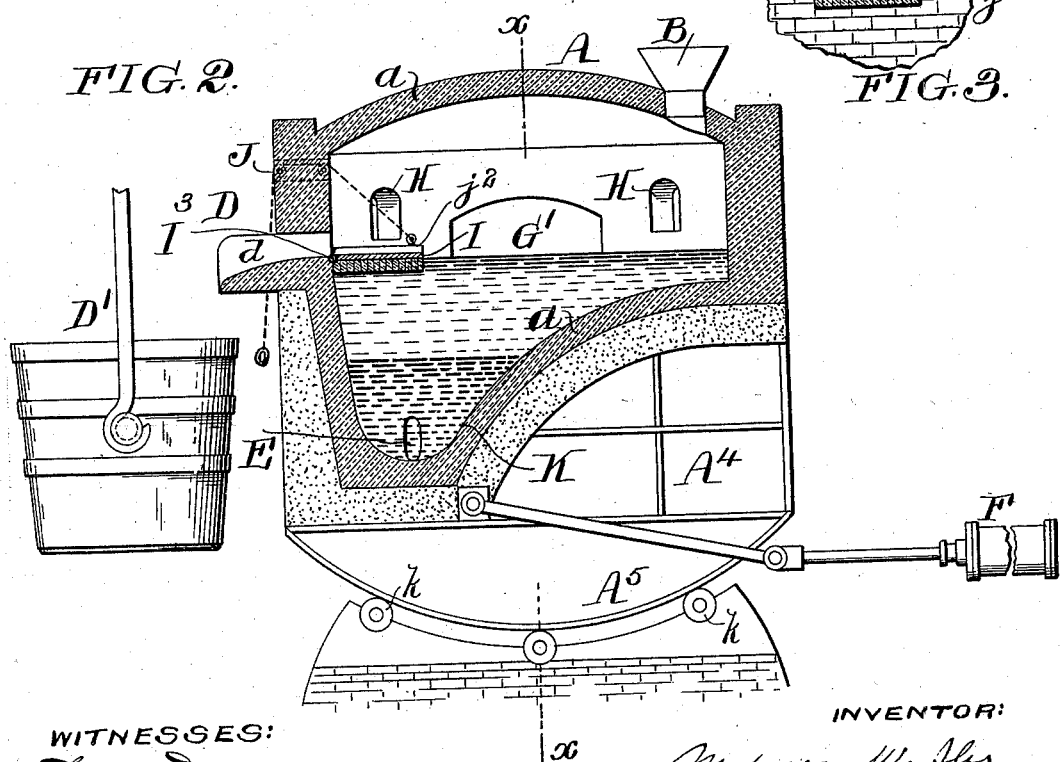
WITNESSES:
INVENTOR:

UNITED STATES PATENT OFFICE.

MALVERN W. ILES, OF DENVER, COLORADO.

APPARATUS FOR SEPARATING MATTE FROM SLAG.

SPECIFICATION forming part of Letters Patent No. 558,648, dated April 21, 1896.

Application filed September 20, 1894. Serial No. 523,555. (No model.)

*To all whom it may concern:*

Be it known that I, MALVERN W. ILES, a citizen of the United States, residing in the city of Denver, in the county of Arapahoe, in the State of Colorado, have invented a certain new and useful Improvement in Apparatus for Separating Matte from Slag, of which the following is a true and exact description, reference being had to the accompanying drawings, which form a part thereof.

My invention relates to an apparatus for separating matte from slag; and it consists in providing a suitable furnace having means for heating the contents thereof, with a suitable slag-spout and matte-tap and arranging means to tip the whole furnace, so as to depress the slag-spout and pour off the slag. The heating means preferably consist of combustible or other heating gases introduced into the furnace.

A further feature of my invention is the arrangement of a plate, preferably hinged, so as to form a door when required, which is arranged below the slag-spout so as to prevent the outflow of any of the matte with the slag.

My improvement will be best understood as explained in connection with the accompanying drawings, in which—

Figure 1 is a sectional view taken on the line $x\,x$ of Fig. 2. Fig. 2 is a sectional view taken on the line $y\,y$ of Fig. 1, and Fig. 3 is a detail view of the slag spout and plate.

A is a suitable furnace, which is preferably lined with fire-brick or similar non-conducting material $a$ and which serves as a receptacle for the matte and slag to be separated.

B is a hopper, through which the slag, as it comes mixed with matte from the blast-furnace, can be dumped.

D is the slag-spout, and I preferably place the inlet-opening and the slag-spout as far apart as possible, so that the matte will have full opportunity to settle from the slag before it is poured off.

E is a suitable opening near or at the bottom of the furnace, through which the matte can be tapped off at suitable intervals.

The matte of course collects at the bottom of the furnace, which is thus, broadly speaking, a matte-well; but as the matte forms but a small percentage of the material treated, I prefer to give my furnace the peculiar conformation shown, whereby a narrow matte-well K is formed at its bottom while a broad surface of the charge is exposed to the heat of the gas or other fuel used to heat the furnace.

To tip the furnace, I support it on a suitable frame $A^4$ and operate this frame by any suitable means, as by a rod connected to a piston or plunger in the hydraulic cylinder F. As shown, the frame has a set of curved rails $A^5$, which are supported on the rollers $k$. When the furnace is tipped by the action of the hydraulic piston, the slag-spout D will be depressed and the slag will flow from the spout into any suitable spot or receptacle, as shown at D'.

In order to heat the contents of the furnace, I provide suitable conduits, as G, for heating gases, preferably gaseous fuel. These conduits, as shown, have passages $g\,g'$ for the combustible gas and air, respectively.

G' are openings, which are preferably at the center of oscillation of the furnace, so that they will register with the conduits G at all positions thereof.

H are openings, through which the interior of the furnace may be inspected and may be luted with fire-clay during the operation of the separator.

In order to prevent any of the matte in the well K from flowing out with the slag when this is poured off, I provide a plate, which is arranged between the well K and the slag-outlet. This plate is shown at I, and I preferably hinge it, as indicated at $I^3$, so that it can be drawn up to act as a door and close the slag-opening $d$ when slag is not being poured therefrom. The plate, when closing the slag-opening, serves also to prevent the escape of any of the gases from the furnace, and I prefer to line it on both sides with fire-brick, as indicated at $j'$, and on the outer side of the plate I, which is its upper side when open, as shown, I form a trough $j^2$ to direct the slag to the spout-opening. This trough is conveniently formed in the fire-brick lining. A chain is shown at J for drawing the door-plate I up, so as to close the slag-opening. This arrangement of a plate to prevent the escape of the matte with the slag when the latter is poured off may obviously be employed in other styles of separators from the particular one here shown.

Having now described my invention, what I claim as new, and desire to secure by Letters Patent, is—

1. An apparatus for separating matte from slag consisting of a furnace having a narrow matte-well at its base and a broad flared upper portion to hold the slag, means for heating the contents of said furnace, a slag-spout at a high level on the furnace, a matte-tap entering the narrow matte-well from which matte can be tapped at will, and means for tipping the furnace to depress the slag-spout and pour off the slag.

2. An apparatus for separating matte from slag consisting of a receptacle having a well for the accumulation of the matte, a slag-spout, a plate arranged between the matte-well and the slag-spout to prevent the outflow of the matte with the slag and means for tipping the receptacle to pour off the slag.

3. An apparatus for separating matte from slag, consisting of a receptacle having a well K for the accumulation of matte, a slag-spout, a hinged plate situated between the matte-well and slag-spout adapted normally to close the slag-discharge opening and adapted when open to extend between the slag-spout and the matte-well so as to prevent the outflow of the matte with the slag and means for tipping the receptacle to pour off the slag.

4. An apparatus for separating matte from slag, consisting of a receptacle having a well K for the accumulation of the matte, a slag-spout, a hinged plate having a trough on its outer side adapted normally to close the slag-discharge opening, and adapted, when open, to extend between the slag-spout, and the matte-well so as to prevent the outflow of the matte with the slag, and at the same time to provide a trough for the slag and means for tipping the receptacle to pour off the slag.

MALVERN W. ILES.

Witnesses:
JOHN S. WILLIAMS,
D. A. JONES.